Patented Jan. 20, 1953

2,626,267

UNITED STATES PATENT OFFICE 2,626,267

PRODUCTION OF ARYLHALOSILANES

Arthur J. Barry, Midland, Mich., assignor to Dow Corning Corporation, Midland, Mich., a corporation of Michigan No Drawing. Application October 16, 1948, Serial No. 55,022. In Great Britain January 13, 1948

5 Claims. (Cl. 260—448.2)

The present invention relates to the preparation of aromatic halosilanes. It is particularly concerned with an improved process for the production of an organohalosilane in which one valence of the silicon atom is satisfied by direct linkage to a carbon atom in a benzenoid hydrocarbon.

The preparation of phenyltrichlorosilane from benzene and trichlorosilane by interacting these materials at an elevated temperature in vapor phase has been described in the literature. In this type of process, phenyltrichlorosilane is not produced at temperatures of 500° C. and below.

In my copending application, Serial No. 674,926, now Patent No. 2,510,853, filed jointly with DePree and Hook, it is shown that benzene may be reacted with an alkyldichlorosilane (RHSiCl₂) to produce an alkylphenyldichlorosilane. The process is conducted under pressure.

I have shown in my copending application Serial No. 784,076, now Patent No. 2,591,668, filed jointly with DePree and Hook that interaction between benzene and trichlorosilane is obtained to a limited extent at temperatures above 288.5° C. and under a pressure above the critical pressure of benzene.

As is known, halomonohydrosilanes, such as trichlorosilane (HSiCl₃), tend to undergo decomposition upon heating, with the elimination of molecular hydrogen and elemental silicon, and the formation of more highly halogenated silanes such as silicon tetrachloride. Accordingly, to obtain phenyltrichlorosilane and other valuable derivatives by interaction of benzene and trichlorosilane, the problem involved is one of controlling preferentially the rates of the desired type of reaction and this side reaction.

Objects of the present invention are to provide an improved process for effecting interaction of benzenoid hydrocarbons and polyhalomonohydrosilanes; for the production of aromatic organohalosilanes in high yield; and for the production of bis(silyl)benzene materials.

In accordance with the present invention, a benzenoid hydrocarbon is reacted with a polyhalomonohydrosilane in the presence of aluminum chloride. The reaction is conducted at a temperature above 250° C. under sufficient pressure that at least a portion of the reaction mixture is in a condensed phase. Under these conditions an aromatic halosilane is produced in good yield.

Benzenoid hydrocarbons with which this invention is concerned include benzene, biphenyl, and alkyl substituted benzenes, such as toluene, xylene, cumene, and mesitylene. Inasmuch as cracking of side chains is obtained with such materials as cumene, and relatively pure products are obtained when the side chains contain but one carbon atom each, it is preferred to employ benzene or the methyl derivatives of benzene as the hydrocarbon.

Polyhalomonohydrosilanes which are suitable for use in this process are compounds of silicon which contain at least two halogen atoms and one hydrogen atom each bonded to the silicon atom, any remaining valence of the silicon atom being satisfied by a monovalent hydrocarbon radical. Examples of suitable polyhalomonohydrosilanes include trichlorosilane, HSiCl₃, monomethyldichlorosilane, CH₃SiHCl₂, and monophenyldichlorosilane, C₆H₅SiHCl₂.

The aluminum chloride is preferably employed in a proportion of at least 0.1 per cent and generally less than 5 per cent, based on the total weight of the reactants.

The process of the present invention is operable over a wide range of proportions of polyhalomonohydrosilane and hydrocarbon in the reaction mixture. It is preferred, based upon economics and the law of mass action, to have less than 20 mols of either of the reactants per mol of the other reactant.

When the polyhalomonohydrosilane and hydrocarbon reactants are employed in approximately equimolecular proportions, a mono(halosilyl) substituted hydrocarbon is produced as a major reaction product. The use of mixtures which contain more than one molecular equivalent of the silane per mol of hydrocarbon would promote production of bis(halosilyl) derivatives of the hydrocarbon.

The reaction mixture is heated at a temperature of from 250° to 400° C., and preferably above 300° C. At temperatures above 400° C. no advantage over conducting the reaction without catalyst is obtained. The pressure employed should be sufficient to ensure that at the temperature of operation at least a portion of the reaction mixture is in a condensed phase. When the operation is conducted at a temperature below the critical temperature of the hydrocarbon the pressure should be sufficient to maintain some liquid phase. When the temperature is above the critical temperature of the hydrocarbon, the pressure should be at least the critical pressure thereof, whereby a condensed phase is present, though present day knowledge of the nature of this state is incomplete. The process may be carried out in various ways, such as by introducing the reactants into the reaction zone under pressure, or by operating under autogenous pressure in a closed system. The indicated phase condition is obtained when there is employed at least 1.2 gram mols of reactants per liter of reactor volume.

The reaction product may be distilled to separate the components thereof. Some decomposition may result from the presence of the aluminum chloride. The decomposition may be minimized by effecting the distillation under vacuum so as to decrease the rate of the decomposition reactions. It is sometimes of advantage to replace the halogen atoms by alkoxy radicals. This is readily accomplished by reaction with an alcohol. The product may be employed as a coating composition.

EXAMPLE 1

By way of illustrating how the process of the invention may be carried into effect, a series of runs was made, in each of which a mixture of 1402 grams of benzene, 2440 grams of monohydrotrichlorosilane ($HSiCl_3$), and 38 grams of aluminum chloride was heated for 16 hours in a 14.4 liter bomb. In each run some condensed phase was present during the heating period. Thereafter, the bomb was cooled, and the product was fractionally distilled.

Table I shows the varied conditions of the runs and the results.

*Table I*

| Run No. | Temp., °C. | Max. Pressure, Lbs./in.² | Total Product, Gms. | $C_6H_5SiCl_3$, Gms. |
|---|---|---|---|---|
| 1 | 305 | 1,020 | 874 | 619 |
| 2 | 324 | 1,250 | 1,230 | 847 |
| 3 | 346 | | 984 | 043 |
| 4 | 375 | 1,740 | 1,180 | 932 |
| 5 | 400 | 1,500 | 1,632 | 927 |

In each of the runs there were recovered unreacted trichlorosilane and hydrocarbon, as well as limited amounts of silicon tetrachloride.

EXAMPLE 2

A mixture of 3120 grams benzene, 2710 grams trichlorosilane, and 13 grams aluminum chloride was heated for 16 hours at an average temperature of 290° C. in a 14.4 liter bomb.

Fractional distillation of the reaction product yielded 53 grams phenyltrichlorosilane and 497 grams of distillation residue which contained organosilicon halides.

That which is claimed is:

1. The method which comprises reacting a benzenoid hydrocarbon free of aliphatic unsaturation in any side chains with a polyhalomonohydrosilane, of the general formula $R_nHSiCl_{3-n}$ in which R represents a monovalent hydrocarbon radical free of aliphatic unsaturation and $n$ has a value of from 0 to 1 inclusive, in the presence of aluminum chloride at a temperature above 250° C. at least a portion of the reaction mixture being in condensed phase, whereby to produce a halosilyl derivative of said hydrocarbon.

2. The method which comprises reacting a benzenoid hydrocarbon free of aliphatic unsaturation in any side chains with a polyhalomonohydrosilane, of the general formula $R_nHSiCl_{3-n}$ in which R represents a monovalent hydrocarbon radical free of aliphatic unsaturation and $n$ has a value of from 0 to 1 inclusive, in the presence of aluminum chloride at a temperature of from 250° C. to 400° C., at least a portion of the reaction mixture being in condensed phase, whereby to produce a halosilyl derivative of said hydrocarbon.

3. The method which comprises reacting benzene with trichlorosilane in the presence of aluminum chloride at a temperature of from 250° C. to 400° C., at least a portion of the reaction mixture being in condensed phase, whereby to produce phenyltrichlorosilane.

4. The method which comprises reacting a benzenoid hydrocarbon free of aliphatic unsaturation in any side chains with trichlorosilane in the presence of aluminum chloride at a temperature of from 300–400° C.; in a closed system under autogenous pressure whereby to produce a trichlorosilane derivative of said hydrocarbon.

5. The method which comprises reacting a benzenoid hydrocarbon free of aliphatic unsaturation in any side chains with a polyhalomonohydrosilane of the general formula $RHSiCl_2$, in which R represents a monovalent hydrocarbon radical free of aliphatic unsaturation, in the presence of aluminum chloride at a temperature of from 250° C. to 400° C.; in a closed system under autogenous pressure whereby to produce a dichlorosilane derivative of said hydrocarbon.

ARTHUR J. BARRY.

REFERENCES CITED

The following references are of record in the file of this patent:

UNITED STATES PATENTS

| Number | Name | Date |
|---|---|---|
| 2,379,821 | Miller | July 3, 1945 |
| 2,405,019 | Dalin | July 30, 1946 |
| 2,407,181 | Scott | Sept. 3, 1946 |
| 2,443,898 | Ellingboe | June 22, 1948 |

OTHER REFERENCES

A. L. Clark, Chem. Revs. 23, 1–15 (1938).

O. Maass., Chem. Revs. 23, 17–27 (1938).

McIntosh and Maass., Can. J. Research B16, 289–302 (1938).

Holder and Maass., Can. J. Research B16, 453–67 (1938).

Bradley, Browne, and Hale, Phys. Rev. 26, 470–482 (1908).